United States Patent [19]

Viosca, Jr.

[11] Patent Number: 4,473,358
[45] Date of Patent: Sep. 25, 1984

[54] HYDROFOIL VESSEL

[76] Inventor: Harry L. Viosca, Jr., 173 Shannon Dr., Mandeville, La. 70448

[21] Appl. No.: 352,222

[22] Filed: Feb. 25, 1982

Related U.S. Application Data

[63] Continuation of Ser. No. 104,719, Dec. 18, 1979, abandoned.

[51] Int. Cl.³ .............................................. B63H 5/02
[52] U.S. Cl. ......................................... 440/92; 440/90; 114/280
[58] Field of Search ............... 114/58, 271, 274, 280; 440/90–94; 416/43, 108, 111, 149, 197, 207, 197 B, 197 A

[56] References Cited

U.S. PATENT DOCUMENTS

| | | | |
|---|---|---|---|
| 356,977 | 2/1887 | Biggio | 416/197 B |
| 665,804 | 1/1901 | Savage | 416/197 A |
| 1,069,880 | 8/1913 | Kasmar | 416/108 |
| 1,911,827 | 5/1935 | Knavs | 440/90 |
| 2,719,000 | 9/1955 | Thevenaz | 416/135 |
| 3,251,334 | 5/1966 | Beardsley | 440/90 |
| 3,299,963 | 1/1967 | Lowe | 416/43 |
| 3,759,213 | 9/1973 | Quady | 440/92 |

Primary Examiner—Trygve M. Blix
Assistant Examiner—Stephen P. Avila
Attorney, Agent, or Firm—Sherman & Shalloway

[57] ABSTRACT

A water-borne vessel propelled by a plurality of propulsion wheels each of which has a plurality of hydrofoil units disposed circumferentially around the drive shaft of the propulsion wheel on a support. In one embodiment, a tire for a land vehicle, is provided coaxially with the hydrofoil units on the drive shaft. The tire has a radius greater than the radial distance between the shaft and the units to form an amphibious vehicle.

17 Claims, 12 Drawing Figures

HYDROFOIL VESSEL

This is a continuation of application Ser. No. 104,719, filed Dec. 18, 1979, now abandoned.

FIELD OF THE INVENTION

The invention relates to water-borne and amphibious vessels powered by paddle type propulsion wheels.

BACKGROUND OF THE INVENTION

In a paddle wheel type water-born vessel, propulsion of the vessel through the water necessitates the overcoming of the inertia of the vessel and the drag of the submerged parts of the vessel in the water. Present paddle wheel type vessels provide means for propelling the vessel through the water by means designed to optimize the forward propulsion component of force obtained by the paddle wheel. Numerous mechanisms have been constructed to manually or in a predetermined pattern periodically control the angle of incidence of the paddle wheel unit with respect to the surface of the water. However, no provision has been made for overcoming the drag of the submerged parts of the vessel by means of the paddle units attached to the paddle wheels.

SUMMARY OF THE INVENTION

It is an object of the invention, therefore, to provide a paddle wheel type vessel having propulsion wheels whose paddles, in addition to providing forward propulsive force, provide a lifting force in order to lift the submerged parts of the vessel out of the water.

It is a further object of this invention to describe an amphibious vehicle which is propelled on land and in water by the same driven structure.

The invention is a water-borne or amphibious vessel propelled by a plurality of propulsion partially submerged discs located along the periphery of the side of the vessel. Each disc is driven by a central drive shaft and has a plurality of hydrofoil units circumferentially disposed around the central drive shaft. When the central drive shaft is rotated by a power source, such as an engine, the units provide propulsive force for the vessel through the water and provide a lifting force to lift the vessel out of the water when the vessel is in motion. The angle of incidence of the hydrofoil units is controlled in response to whether the vessel is accelerating or decelerating in the water.

BRIEF DESCRIPTION OF THE DRAWING

The features characteristic of the invention as to its organization, method of operation, and applications will best be understood by the description presented below when read in connection with the accompanying drawing. Although the description presented below relates especially to the embodiments of the invention illustrated in the drawing, this description is not intended to limit the scope of the invention which is defined in the claims.

DETAILED DESCRIPTION OF THE INVENTION

Figure 1A:
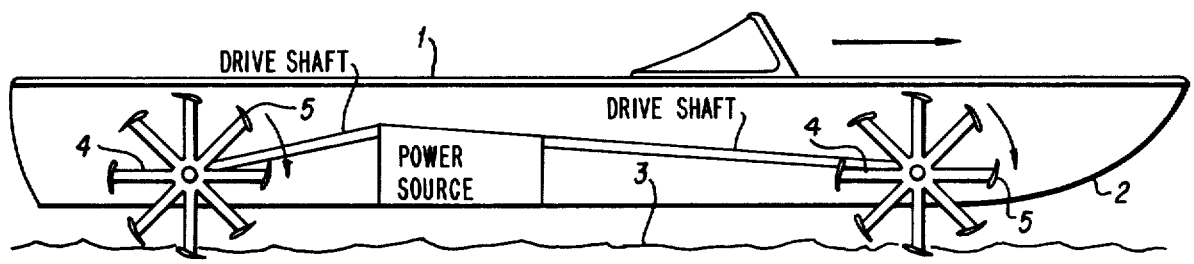
FIG. 1A shows a side view hydrofoil vessel of the invention.
Figure 1B:
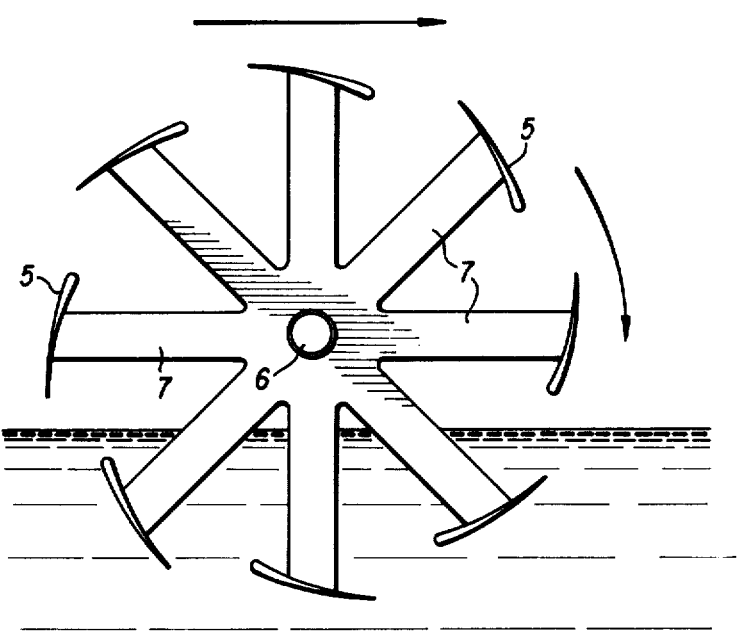
FIG. 1B shows a side view of a propulsion wheel of the invention, having stationary hydrofoil units attached thereto.
Figure 2:
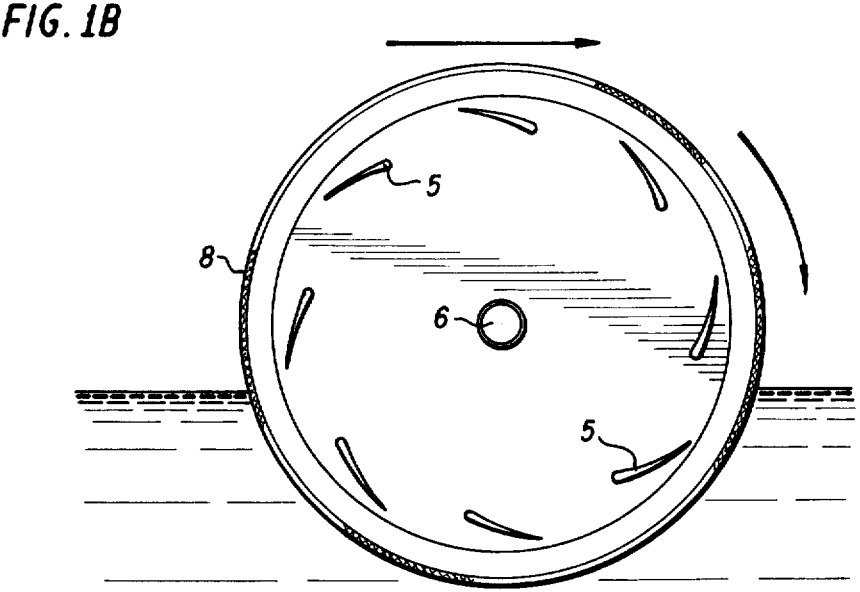
FIG. 2 shows a propulsion wheel of the invention equipped for for amphibious operation.

FIG. 1A shows a hydrofoil vessel. Vessel 1 is provided with a hull-shaped body, which is designed to reduce the drag of the water 3 on the body of the vessel when the speed of the vessel is such that the hull 2 is submerged in the water. A plurality of propulsion wheels 4 are located on the side of the vessel 1. As shown in FIG. 1A, when the propulsion wheels 4 have attained sufficient speed, the body of the vessel is lifted out of the water by the lifting forces provided by the hydrofoil units 5. FIG. 1B shows a basic propulsion wheel wherein hydrofoil units 5 are distributed circumferentially around drive shaft 6 on spoked supports 7. As shown in FIG. 2, a propulsion wheel suitable for use either in water or on land is obtained when a tire 8 is attached to drive shaft 6. The tire 8 has a radius greater than the distance between the shaft 6 and the hydrofoil units 5. The shaft of vessel 1 can be powered by any suitable source; for example, a diesel engine or a gas turbine. The hydrofoil units 5 may assume any suitable aerodynamic or hydrodynamic shape which provides a lifting force on one side of the hydrofoil as the hydrofoil rapidly passes through the water.

In operating the vessel 1 in the water 3, three distinct operating conditions are encountered; namely, acceleration, cruising, and deceleration. Each of these operating conditions is caused by differences between the speed of the propulsion wheel and the speed of the vessel over the surface of the water. When the vessel is at rest and begins to accelerate, the propulsion wheel spins rapidly in relation to the speed of the vessel over the water. When the vessel is decelerating, the propulsion wheel is turned at a slower rate than the vessel speed through the water. During cruising, when no gain or loss of speed occurs, the speeds of the propulsion wheel and the vessel are in balance. From a balanced condition, that is the vessel cruising, an attempt to decelerate to bring the vessel to a stop would result in the occurrence of downward reactive force tending to forcefully submerge the vessel. This condition would occur if the angle of incidence of the hydrofoil unit during cruising did not change upon deceleration. However, if the angle of incidence is altered appropriately, these downward reactive forces would not occur.

Figure 3A:
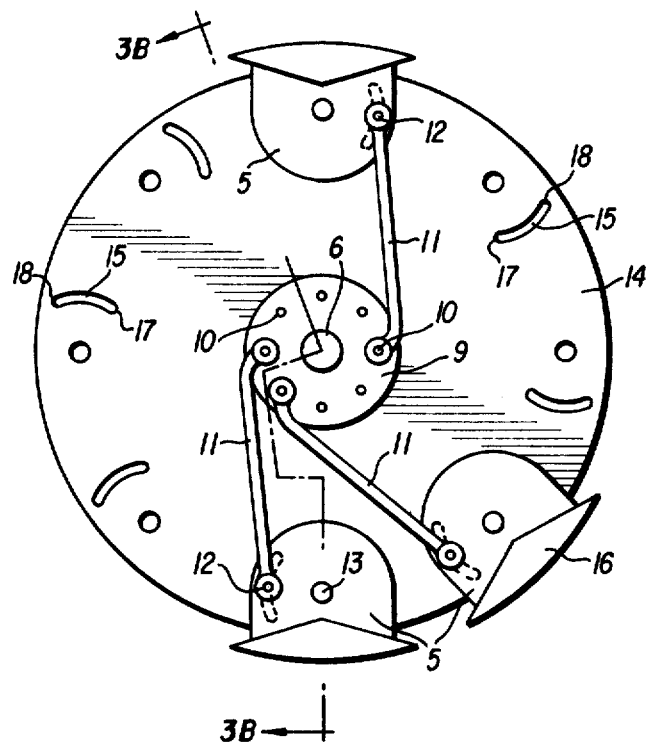
FIG. 3A shows one embodiment of the invention for automatically controlling the angle of incidence of the hydrofoil units.

FIGS. 3A, 3B, 4A, and 4B disclose means for automatically altering the angle of incidence of the hydrofoil units upon acceleration, cruising, and deceleration. In FIG. 3A, a means for automatically adjusting the angle of incidence of the hydrofoil units is shown. Driving wheel 9, connected directly to drive shaft 6, is provided with a plurality of pivot pins 10 each of which is connected to a connecting rod 11 which in turn is eccentrically connected to hydrofoil units 5 by means of pivot pins 12. The hydrofoil units 5 are pivotally attached by means of pins 13 to driven wheel 14 provided with slots 15. When the vessel is being accelerated, driving wheel 9, rotated in a clockwise direction by drive shaft 6, causes pins 10 to pull rods 11 which in turn rotate hydrofoil units 5 clockwise around pivot pins 13, thereby changing the angle of incidence of the blade portions 16 of the hydrofoil units 5. The amount of rotation of the hydrofoil unit 5 around pivot pin 13 is limited by slot 15 in driven wheel 14. On acceleration, pin 12 goes to end 17 of slot 15. It is understood that the pivot pins 12 extend through the hydrofoil unit 5 and also through driven wheel 14. Upon deceleration, driving wheel 9 effectively rotates counterclockwise with respect to driven wheel 14, thereby pushing rods 11 against hydrofoil units 5 and rotating units 5 around pins 13 in a counterclockwise direction. As a result, the angle of incidence of blade 16 of hydrofoil unit 5 is reversed. The extent of change of the angle of incidence is controlled by the end 18 of slot 15.

Figure 3B:
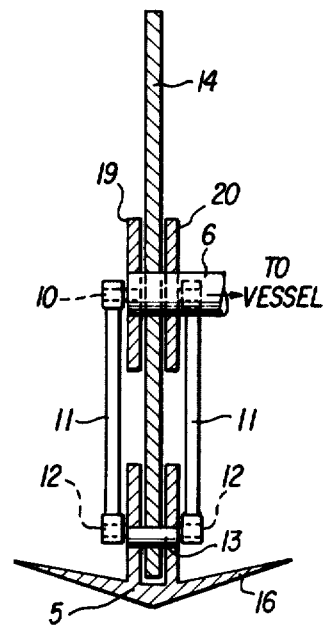
FIG. 3B shows a cross-section taken along line 3B—3B of the propulsion wheel of the invention depicted in FIG. 3A.
Figure 5A:
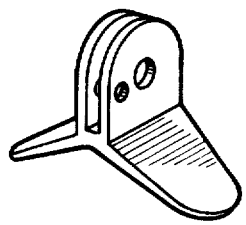
FIGS. 5A through 5D show alternate hydrofoil unit blade shapes.
Figure 5B:
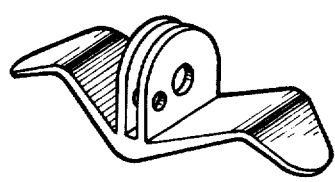
Figure 5C:
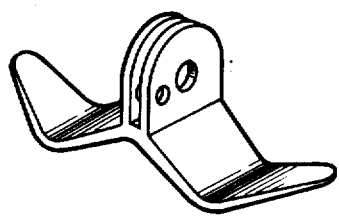
Figure 5D:
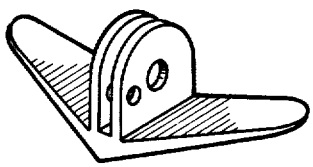

In FIG. 3B, a cross-section taken along the indicated plane in FIG. 3A is shown. Here it is seen that the driven wheel 14 is centrally disposed along the drive shaft 6 between two component parts 19 and 20 of driving wheel 9. Two sets of connecting rods 11 extend from driving wheel parts 19 and 20 to pivot pin 12 (shown in dotted outline behind pin 13) which extends through the hydrofoil unit and driven wheel 14. Pivot pin 12 provides slidable attachment of hydrofoil unit 5 to driven wheel 14 in slot 15. Hydrofoil unit 5 is pivotally attached to the driven wheel 14 by pivot pin 13.

Clearly, in the embodiment shown in FIG. 3, whenever a significant amount of power is applied along the drive shaft 6, causing the driving wheel 9 to rotate (e.g. clockwise) with respect to the driven wheel 14, the foil units 5 will rotate in the corresponding direction (clockwise) to their extreme limit. In the specific embodiment shown, when the power (applied through rods 11 to the foil units 5 by the drive shaft 6) is changed in direction, the pins 12 will shift between the end limits 17, 18. FIG. 3 shows the pins 12 between the end limits as would occur during such shift of direction. It is anticipated that, during cruise conditions, the relationship betwen the driving wheel 9 and the driven wheel 14 may be such that the pins 12 would be at the ends 17 or 18 of slots 15.

Figure 4A:
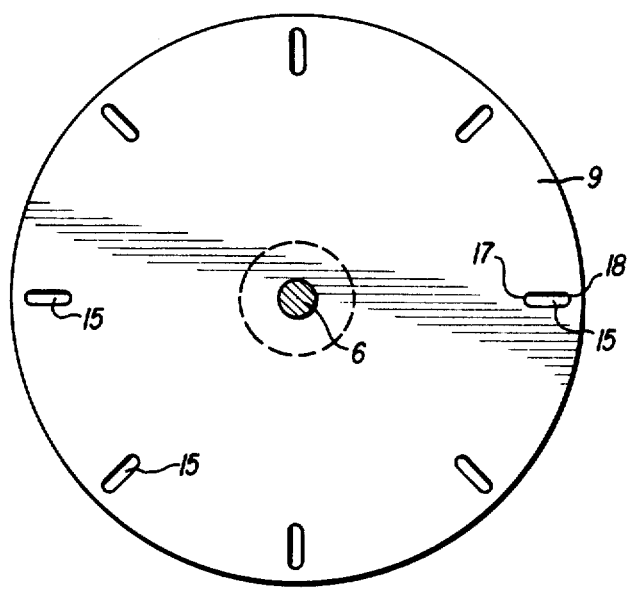
FIGS. 4A, 4B, and 4C show an alternate propulsion wheel of another embodiment of the invention for automatically controlling the angle of incidence of the hydrofoil units.
Figure 4B:
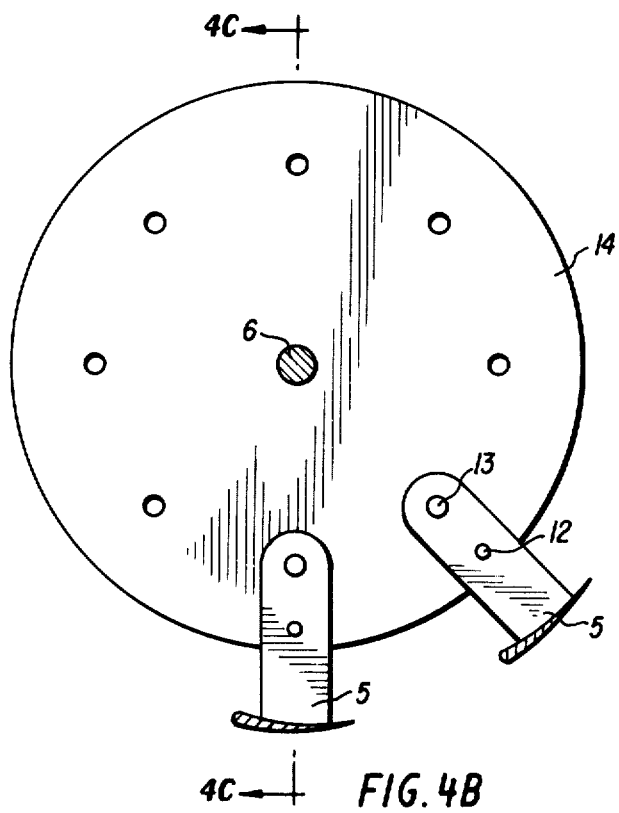
Figure 4C:
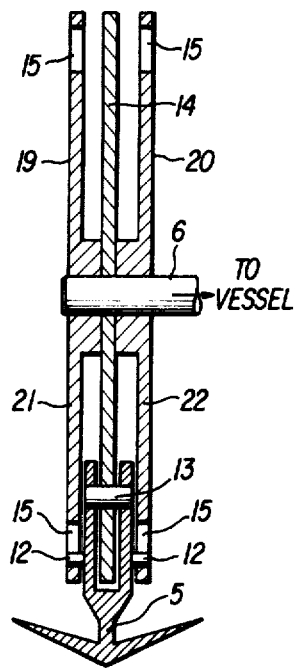

In FIGS. 4A, 4B, and 4C, an alternate means for automatically adjusting the angle of incidence of the hydrofoil units is shown. This embodiment does not require the use of connecting rods 11. Driving wheel 9 in side view FIG. 4A has slots 15 circumferentially disposed around drive shaft 6. As shown in FIG. 4B, driven wheel 14 has pins 13 circumferentially disposed around drive shaft 6 also. As shown in FIG. 4C, a cross-section taken along the indicated plane in FIG. 4B, driving wheel 9 is seen to be comprised of two parts 19 and 20 between which driven wheel 14 is placed. The two parts 19 and 20 are seen to have extensions 21 and 22 which extend to pivot pins 12 of hydrofoil unit 5. The extension of the driving wheel 9 by means of extensions 21 and 22 eliminates the need for connecting rods 11 as shown in FIGS. 3A and 3B. Hydrofoil units 5 are pivotally attached by pin 13 to driven wheel 14. Pins 12 extend from hydrofoil units 5 through slots 15 in driving disk 9 and provide slideable attachment of hydrofoil units 5 to driven wheel 14 in slots 15. In operation, upon acceleration, when driving wheel 9 is rotated clockwise on shaft 6, pin 12 is forced in slot 15 to end 17 of the slot thereby causing the hydrofoil unit 5 to pivot around pin 13 and alter the angle of incidence of the hydrofoil unit. Upon deceleration, driving wheel 9 is effectively rotated counterclockwise thereby causing pin 12 to move to end 18 of slot 15 thereby reversing the angle of incidence of blade 16 of hydrofoil unit 5.

By causing the forward wheels to rotate in a direction opposite to the rearward wheels, the craft could be made to hover in one spot. The hydrofoil blades can be designed symmetrically for operation in either direction of rotation. Such symmetrical hydrofoil units, examples of which are shown in FIGS. 5A through 5D, would also be useful on double-ended vessels where it would not be necessary to turn the vessel around in order to reverse direction of motion; an example of such a vessel is a ferry boat.

As the propulsion wheels 4 are rotated, each hydrofoil unit enters the water at a given angle of incidence. The drag or resistive forces encountered by the hydrofoil unit as it enters the water creates an upward force on the propulsion wheel 4 which tends to lift the propulsion wheel 4 and consequently the entire vessel out of the water. As the hydrofoil unit continues to travel within the water and reaches the lowest point in its rotation, the drag or resistive forces in the water create a forward force acting on the propulsion wheel and consequently the vessel. As the hydrofoil unit leaves the water it tends to create a slight downward force on the propulsion wheel 4. However, due to the aerodynamic shape of the hydrofoil unit this slight downward force is significantly less than the upward force initially created when the hydrofoil unit enters the water. Therefore, the upward force is generally greater than the downward force and is not counteracted. Adjusting the angle of incidence of the hydrofoil units as noted and described above further enhances the upward and forward forces created by the hydrofoil unit as it is rotated through the water. In contrast, during deceleration the angle of incidence of the hydrofoil units is altered so that the downward force is greater than the upward force tending to pull the vessel back into the water and slow the vessel down.

The preferred angle of incidence of each hydrofoil unit depends upon the particular shape of the hydrofoil unit and the amount of submersion that the hydrofoil unit normally is subjected to. It is contemplated that the hydrofoil unit may have flat aerodynamically shaped blades such as the "Vee" shape illustrated in FIG. 5D or the inverted "Vee" shape illustrated in FIG. 5A. Alternatively, the blades of the hydrofoil unit according to the invention may be curved or have a sinusoidal shape such as illustrated by the "GULL" shape illustrated in FIG. 5E and the inverted "GULL" shape illustrated in FIG. 5C.

It is further contemplated that each of the hydrofoil units may be individually controlled in order to achieve particular lift or drag effects. For example, the rods 11 illustrated in the embodiment of FIG. 3A may be hydraulically selectively expandable so that selective hydrofoil units 5 may be provided with greater or lesser angles of incidence. Alternatively, each hydrofoil unit may be mounted to the propulsion wheel 4 by separate means which are individually controlled.

As a result of the angles of incidence of the hydrofoil units automatically assuming an optimum angle with respect to the water, less unwanted, undesired forces are imposed upon the vessel and consequently the power requirements for a given size craft would be reduced. Because during normal cruising operation, most or all of the vessel hull is outside the water, relatively high speed operation is attainable. In an amphibious embodiment of the hydrofoil vessel, as disclosed above, high speed operation in both water and on land is attainable. Such vehicles would have practical utility for military, commercial, industrial, pleasure, or rescue operations.

Steering of this type vessel may be accomplished without the use of conventional rudders which cause unnecessary drag. Steering may be effected by varying the speed or direction of individual propulsion wheels or by varying both the speed and the direction. By adjusting the speed of rotation of the propulsion wheels of the vessel, the vessel could be operated above the surface of the water or partially submerged, whichever is desired. The vessel can be stopped abruptly when the wheels are reversed in their direction of operation.

Though embodiments of the invention having a plurality of propulsion wheels have been shown and described above, it is understood that another embodiment of the invention may have but one propulsion wheel.

In view of the many variables to be encountered in propelling a vessel over water, such as the weight of the entire unit, the changing wave conditions which may be encountered and the variable rotational speeds which may be employed, it should be understood that a vessel according to the present invention may operate, at least for intervals, substantially entirely upon the surface of the water and without substantial submersion of its hydrofoil units. In this condition, the hydrofoil units would meet the surface of the water as a succession of impact surfaces, instead of foils driving through the liquid medium. This operating condition is not, however, to be construed as being contrary to the terminology used herein. Accordingly, the terms "angle of incidence" and "hydrofoil unit", as used herein, should be construed as respectively including "angle of impact" and "impact surfaces" under the described condition of "on-top" operation.

What is claimed is:

1. A vessel comprising:
   (a) a hull;
   (b) a power source located on the hull;
   (c) a shaft rotatably driven by the power source;
   (d) at least one hydrofoil means connected to said shaft, said hydrofoil means being positioned on said hull for lifting and propelling the vessel and including a plurality of hydrofoil units for providing upward and horizontal movement to the vessel when the hydrofoil means is at least partially submerged and rotated;
   (e) means for maintaining each of the hydrofoil units simultaneously at the same angle, with respect to its hydrofoil means, as the other hydrofoil units on the same hydrofoil means;
   (f) said hydrofoil units being pivotally mounted on means surrounding said shaft, the pivoting motion of said hydrofoil units being limited to a pre-determined arc extending on opposite sides of a position on said arc wherein said hydrofoil units are each substantially symmetrically bisected by radii extending from the shaft means through each hydrofoil unit, said means for maintaining including means linking said hydrofoil units to said shaft;
   (g) said means for maintaining further including a means for adjusting the angle between each of the hydrofoil units on the hydrofoil means whereby the tangential angle of each of the hydrofoil units may be simultaneously and synchronously adjusted, the means for adjusting being responsive to the forces of water on the hydrofoil units and the force applied to the hydrofoil units as the power source drives the shaft.

2. The vessel of claim 1 wherein the hydrofoil unit is a "VEE" shaped wing.

3. The vessel of claim 2 wherein the wing is inverted.

4. The vessel of claim 1 wherein the hydrofoil unit is a "GULL" shaped wing.

5. The vessel of claim 4 wherein the wing is inverted.

6. The vessel of claim 1 wherein the means surrounding said shaft comprises a wheel connected to said shaft, said wheel having a plurality of said hydrofoil units disposed about its periphery.

7. The vessel of claim 1 further including a land-propelling means engaging said shaft.

8. The vessel of claim 7 wherein said land-propelling means is a tire having a radius greater than the radial distance between the shaft and the hydrofoil units.

9. The vessel of claim 1 wherein the hydrofoil means includes a driving wheel connected to sahd shaft, said means surrounding said shaft comprising a driven wheel rotatably driven by said driving wheel, the hydrofoil units being located on the periphery of said driven wheel and a means interconnecting the driving wheel and the hydrofoil units.

10. The vessel of claim 9 wherein said means interconnecting comprises a rod eccentrically, pivotally connected to each said hydrofoil unit and pivotally connected to said driving wheel.

11. The vessel of claim 9 wherein said means interconnecting comprises a rigid portion extending from said driving wheel and pivotally, eccentrically connected to each hydrofoil unit.

12. A hydrofoil vessel having a driven propulsion means comprising one or more propulsion wheels each of which includes a plurality of hydrofoil units disposed circumferentially about each of the propulsion wheels, wherein:
   (a) the propulsion wheels include means for adjusting the angle of incidence of the hydrofoil units in response to the conditions of acceleration, cruising, and deceleration,
   (b) each of the hydrofoil units on any of said propulsion wheels are maintained at the same tangential angle as the other hydrofoil units on that wheel;
   (c) the adjustment of the angle of incidence of the hydrofoil units is effected by the forces of water on the hydrofoil units and the force applied to the propulsion wheel by a drive means; and
   (d) the angle of incidence of said hydrofoil units being adjustable by said means for adjusting in two directions from a position wherein each of said hydrofoil units are substantially symmetrically bisected by radii extending from a drive shaft extending substantially perpendicularly through each said propulsion wheel.

13. A hydrofoil vessel as described in claim 12 wherein the means for adjusting the angle of incidence of said hydrofoil units on the propulsion wheel comprises a driving wheel coupled directly to said drive shaft and pivotally connected by connecting means to said hydrofoil units wherein the hydrofoil units are pivotally connected to a driven wheel provided with slots which provide limits to the angle of incidence of the hydrofoil units.

14. A hydrofoil vessel as described in claim 13 wherein the driving wheel comprises two parallel and spaced components connected to the axis of rotation of the propulsion wheel and wherein the driven wheel is placed between said two parallel and spaced components of the drive wheel and wherein two sets of connecting means are pivotally connected between the driving wheel components and the hydrofoil units which are both slideably and pivotally attached to said driven wheel.

15. A hydrofoil vessel as described in claim 12 wherein the means for adjusting the angle of incidence of said hydrofoil units on the propulsion wheel comprises a driving wheel coupled directly to the drive shaft; wherein the driving wheel has circumferentially disposed slots; wherein the slots receive pins connected to the hydrofoil units thereby providing a slideable attachment of the hydrofoil units to the driving wheel in the slots; wherein the hydrofoil units are pivotally attached to a driven wheel which is supported by the axis of rotation of the propulsion wheel; and wherein the slots provide limits to the angle of incidence of the hydrofoil units.

16. A hydrofoil vessel as described in claim 15 wherein the slotted driving wheel comprises two parallel and spaced components connected to the drive shaft and wherein hydrofoil units are slideably attached to the driving wheel between the two parallel and spaced components of the driving wheel and wherein the hydrofoil units are pivotally attached to the driven wheel which is placed between the two parts of the driving wheel.

17. A hydrofoil amphibious vessel having propulsion means comprised of one or more propulsion wheels each of which includes:
    (a) a plurality of hydrofoil units disposed circumferentially around each propulsion wheel;
    (b) a tire disposed coaxially with said hydrofoil units and having a radius greater than that of said hydrofoil units, thereby providing a propulsion wheel suitable for use on land or in the water;
    (c) a power source driving the propulsion wheels;
    (d) a means for maintaining each of the hydrofoil units simultaneously at the same angle with respect to a hydrofoil means as the other hydrofoil units on the same hydrofoil means;
    (e) a means for adjusting the angle between each of the hydrofoil units and the hydrofoil means whereby the tangential angle of each of the hydrofoil units may be simultaneously and synchronously adjusted, the means for adjusting being responsive to the forces of water on the hydrofoil units and the force applied to the hydrofoil units as the power source drives the shaft; and
    (f) said means for adjusting allowing adjustment of the position of each of the hydrofoil units in two directions from a position wherein each of said hydrofoil units are substantially symmetrically bisected by radii extending from a drive shaft extending substantially perpendicularly through each said propulsion wheel, said drive shaft being connected to said power source.

* * * * *